G. CURKENDALL.
Plow Colter.
No. 103,148. Patented March 17, 1870.
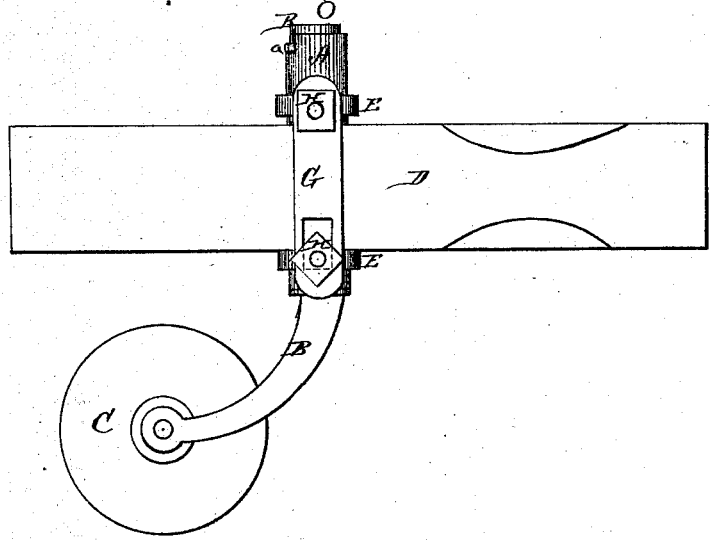
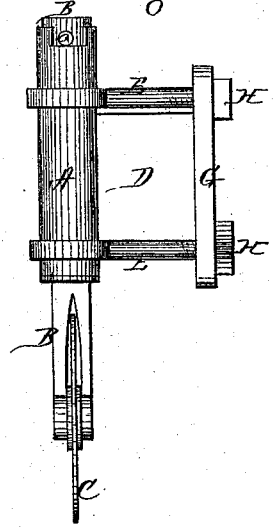
Witnesses
Henry N. Miller
John A. Ellis
Inventor
George Curkendall
Per
T. H. Alexander
Atty.

United States Patent Office.

GEORGE CURKENDALL, OF DIXON, ILLINOIS.

Letters Patent No. 103,148, dated May, 17, 1870.

IMPROVEMENT IN PLOW-COLTERS.

The Schedule referred to in these Letters Patent and making part of the same.

*To all whom it may concern:*

Be it known that I, GEORGE CURKENDALL, of Dixon, in the county of Lee and in the State of Illinois, have invented certain new and useful Improvements in Plow-Colters; and I do hereby declare that the following is a full, clear, and exact description thereof, reference being had to the accompanying drawings and to the letters of reference marked thereon, which form a part of this specification.

The nature of my invention consists in the construction and arrangement of a colter for plows, and in the manner of attaching the same to the plow-beam.

In order to enable others skilled in the art to which my invention appertains to make and use the same, I will now proceed to describe its construction and operation, referring to the annexed drawings, in which—

Figure 1 is a side elevation, and

Figure 2, a front view of my colter, attached to a plow-beam.

A represents a sleeve or tube, through which the stem B of the colter passes.

The upper edge of the sleeve A is notched on its rear side, and the stem B is at its upper end provided with a pin, $a$, which rests in said notch on the tube, and thus secures the colter to the sleeve, but, at the same time, allows it to swing loose.

The lower end of the stem B is curved backward, and this end is forked, so as to allow the colter C to be pivoted within it.

The sleeve A is secured to the plow-beam D by means of two eye-bolts, E E, placed one on the upper and the other on the lower side of the plow-beam, the sleeve passing through the eyes on said bolts.

On the opposite side of the plow-beam from that on which the sleeve is placed the eye-bolts pass through a plate, G, and are secured on the outside of said plate by means of nuts, H H, thus binding the sleeve firmly to the plow-beam. One, or, if desired, both of the bolts pass through slots in the plate G, allowing the colter to be attached to any sized plow-beam, and, also, to be adjusted more easily in any desired position without injury to the wood.

Although my device may be made of any desired material, I prefer to make the sleeve of wrought iron, which makes it light, neat, and cheaper than any attachment now in use.

Having thus fully described my invention,

What I claim as new, and desire to secure by Letters Patent, is—

The sleeve A, colter-stem B, eye-bolts E E, slotted plate G, and nuts H H, all constructed and combined, in the manner and for the purpose set forth.

In testimony that I claim the foregoing as my own, I affix my signature in presence of two witnesses.

GEO. CURKENDALL.

Witnesses:
CHAS. D. TODD,
EDWIN WHITMORE.